United States Patent [19]

Jones

[11] Patent Number: 4,466,496
[45] Date of Patent: * Aug. 21, 1984

[54] TECHNIQUE FOR DAMPING OSCILLATIONS IN A DRILL STRING

[75] Inventor: Kenneth R. Jones, Corpus Christi, Tex.

[73] Assignee: Mustang Tripsaver, Inc., Corpus Christi, Tex.

[*] Notice: The portion of the term of this patent subsequent to Mar. 10, 1998 has been disclaimed.

[21] Appl. No.: 184,678

[22] Filed: Sep. 8, 1980

Related U.S. Application Data

[63] Continuation of Ser. No. 57,848, Jul. 16, 1979, abandoned, which is a continuation of Ser. No. 950,057, Nov. 10, 1978, abandoned, which is a continuation-in-part of Ser. No. 849,719, Nov. 8, 1977, abandoned.

[51] Int. Cl.³ ............................................. E21B 17/07
[52] U.S. Cl. ..................................... 175/67; 175/321
[58] Field of Search ............... 267/135, 162, 137, 125; 64/23, 27 R; 175/321; 173/120

[56] References Cited

U.S. PATENT DOCUMENTS

| 3,301,009 | 1/1967 | Coulter, Jr. | 175/321 |
| 3,383,126 | 5/1968 | Salvetoir et al. | 175/321 X |
| 3,853,188 | 12/1974 | Vasiliev | 175/321 |
| 3,963,228 | 6/1976 | Karle | 267/166 |

Primary Examiner—William F. Pate, III
Attorney, Agent, or Firm—G. Turner Moller

[57] ABSTRACT

There is disclosed a shock sub for incorporation in the lower part of a drill string for damping oscillations of the bit and drill string during drilling. The shock sub incorporates a spring assembly including a multiplicity of substantially annular ring springs that exhibit a spring rate of less than about 25,000 pounds per inch of deflection.

4 Claims, 4 Drawing Figures

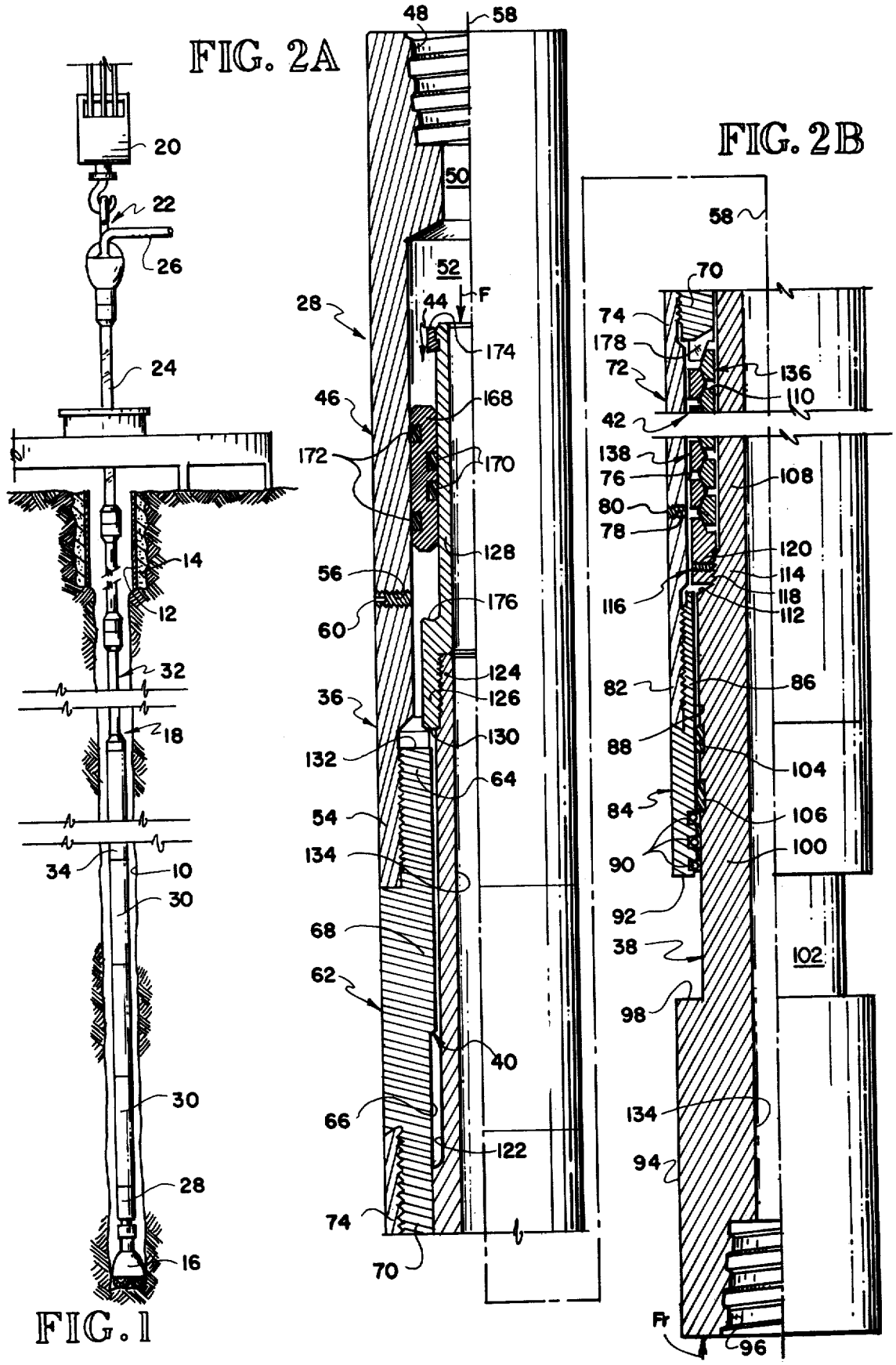

TECHNIQUE FOR DAMPING OSCILLATIONS IN A DRILL STRING

This application is a continuation of application Ser. No. 57,848, filed July 16, 1979, now abandoned, which is a continuation of application Ser. No. 950,057, filed Nov. 10, 1978, now abandoned, which is a continuation-in-part of application Ser. No. 849,719, filed Nov. 8, 1977, also now abandoned.

This invention relates to shock subs for use in drill strings and methods of using the same.

It is well known in the art of drilling wells that the drill string and bit are subjected to substantial axial oscillations. As discussed in Down Hole Measurements of Drill String forces and Motions, Journal of Engineering for Industry, May 1968, pages 217-225; Analysis of Down Hole Measurements of Drill String Forces and Motions, AIME Transactions, May 1968, pages 208-216; and Longitudinal and Angular Drill String Vibrations with Damping, Journal of Engineering for Industry, November 1968, pages 671-679, these oscillations are caused by pressure variations in the drill string, impact of bit teeth against the rock face being drilled, bit cone action against the rock face being drilled and rotation of the drill string. Under some circumstances, the oscillations can be so great as to cause the bit to move vertical off the rock face being drilled. Even in situations where the oscillations are not so severe, the oscillations can cause decreased bit tooth life, shortened bit bearing life, decreased fatigue life of the drill collars and drill pipe and shortened fatigue life of the derrick. It is accordingly not surprising that considerable effort has been spent on vibration damping devices for incorporation in a drill string.

Broadly, drill string shock subs comprise an outer barrel having a screw connection at one end, a mandrel telescopingly received in the barrel and having a screw connection at the opposite end, and a spring mechanism of some description operating between the barrel and mandrel. Spring mechanisms of wide variety have been suggested for use in shock subs. Exemplary spring designs include annular abutted metallic plates as shown in U.S. Pat. No. 2,570,577; helical springs as shown in U.S. Pat. No. 3,122,902; gas springs as shown in U.S. Pat. No. 3,230,740; pivoting metal sections as shown in U.S. Pat. Nos. 3,254,508 and 3,447,340; Belleville springs as shown in U.S. Pat. No. 3,871,193; and rubber or rubber-like springs as shown in U.S. Pat. Nos. 3,033,011; 3,099,918; 3,301,009 and 3,339,380.

Also of interest is the disclosure in U.S. Pat. No. 3,853,188 in which a plurality of ring springs are used in a device for building up down pressure on the face of the bore hole during drilling. In a first embodiment of this device, tensile pulses in the drill string are stated to be damped while compressive pulses are said to be reflected. In a second embodiment of the device, compressive pulses are said to be damped while tensile pulses are stated to be reflected. In addition, the ring springs of this device are said to periodically move out of contact. This is in contrast to the device of this invention in which the adjacent ring springs are as continuously in contact as can be arranged.

The spring types in commercially available shock subs correspond broadly to the spring types illustrated in the patents cited above to the extent that there are available shock subs having gas springs, Belleville springs, rubber springs and helical springs. Each major type spring has substantial disadvantages. The gas springs exhibit a spring rate that varies in response to drilling depth as do some of the rubber spring devices. Although other of the rubber spring devices exhibit a constant spring rate with respect to depth, the spring rates are quite high, usually in the range of 90,000-120,000 pounds per inch of deflection. Although the helical springs exhibit a relatively low constant spring rate, e.g. 35,000 pounds per inch of deflection, this type tool is quite long which tends to destabilize the drill string. In addition, the helical spring is machined from a single piece of steel stock and is accordingly inherently expensive.

There are three interrelated design criteria which dictate the performance of a shock sub: load capacity, spring rate and deflection. It is suggested in the prior art that the lower the spring rate, the more effective will be the shock sub in damping vibrations as pointed out in the article entitled Longitudinal and Angular Drill String Vibrations with Damping, supra, and a publication of Johnston-Schlumberger, entitled "Shock Guard Drilling Shock Absorber." The load capacity of a shock sub is normally dictated by the maximum weight applied to the bit during drilling which is normally a function of bit diameter. Although the maximum weight applied to drilling bits varies somewhat, it is normally in the range of 6,000-9,000 pounds per inch of bit diameter. Load, deflection and spring rate in a mechanical spring assembly are related by the equation:

$$\text{Load} = (\text{Deflection}/\text{Spring Rate}). \tag{1}$$

Accordingly, when the load capacity is dictated by external circumstances, one can only decrease the spring rate of the system by increasing deflection.

Another design constraint to be reckoned with is the maximum diameter available for the spring. Because the nominal hole size is dictated by the size of the bit, it is self-defeating to contemplate utilizing a larger bit to give more tool area for two reasons. First, the industry will dictate the size bits to be used and the tool must be designed accordingly. Second, the larger the bit, the greater the load capacity required. There is, however, very little theoretical design constraint imposed on the axial length of the spring although it is desirable that the shock sub be as short as possible to maintain the drill collars as stable as possible.

To illustrate the problem, a typical bit size is 7⅞" in diameter and accordingly has a maximum design weight applied thereto in the range of 47,000-70,000 pounds. Because there must be sufficient clearance between the external surface of the shock sub and the wall of the hole to allow cuttings and mud to pass therethrough, the maximum external diameter of the shock sub can be no greater than about 6⅝". The mandrel must have a conduit providing a passage for mud traveling downwardly to the bit of about the same size as the passage through the drill pipe and drill collars. In addition, the passage through the mandrel must be of sufficient size to receive a fishing spear. Accordingly, a passage in the range of 1¼"-3" is required. It will accordingly be seen, using average values, that the barrel, mandrel and spring can occupy an annular area having an external diameter of about 6⅝" and an internal diameter of about 2¼". Because a great deal of this area must be occupied by structural steel members comprising the wall of the barrel and wall of the mandrel, there is precious little design freedom in selecting the operating diameters of the spring mechanism installed between the mandrel and barrel.

Although the amount of weight applied to the bit is a function of diameter, normally the amount of weight and accordingly the load capacity of the spring assembly of this invention is in the range of 10,000–125,000 pounds. With more typically sized bits, the amount of weight and the load capacity is typically in the range of 30,000–75,000.

To further illustrate the effects of design constraint on the spring assemblies, it is believed that the 35,000 pound/inch spring rate of the helical spring in the shock sub offered by Johnston-Schlumberger probably represents a design which minimizes spring rate as far as practicable for the load capacity required of shock subs. In other words, it is believed impossible to design a practical helical spring having a substantially lower spring rate and providing the requisite load capacity and life expectancy within the constraints dictated by hole size, central passage and tool length.

The shock sub of this invention is broadly organized to include an outer barrel having a screw connection on one end for connection to either the bit or the drill collars, a mandrel telescopingly received in the barrel and having a screw connection on the other end for connection in the drill string, and a spring assembly operating between the barrel and mandrel to damp relative movement between the barrel and mandrel. The shock sub is accordingly reversible in the sense that it can be run with the barrel connection down or with the mandrel connection down. As will be more fully pointed out hereinafter, a given shock sub of this invention has significantly different load capacities, because of the application of hydrostatic pressure inside the tool, when reversed.

The spring assembly in the shock sub is designed to provide a load capacity of 10,000–125,000 pounds and more typically has a load capacity of 30,000–75,000 pounds. The deflection of the spring is substantially less than twenty inches and the spring rate is less than 25,000 pounds per inch of longitudinal tool movement and is more desirably less than 15,000 pounds per inch of longitudinal tool movement.

The spring assembly comprises a multiplicity of annular inner springs having radially outer surfaces inclined to the axis of the shock sub and a multiplicity of annular outer springs having radially inner surfaces inclined to the axis of the shock sub. The inner and outer springs are stacked alternately in a chamber between the barrel and mandrel so that collapsing movement of the barrel and mandrel causes the springs to move axially toward each other. The inclined surfaces of the inner and outer springs engage during collapsing movement of the barrel and mandrel causing the outer springs to be stressed in tension and the inner springs to be stressed in compression substantially only in a multiplicity of planes perpendicular to the axis of the shock sub. The spring assembly of this invention accordingly utilizes what are sometimes called "ring springs" which are broadly known in the art as shown in U.S. Pat. Nos. 745,425; 1,598,228; 1,689,662; 1,700,133; 2,413,740; 2,515,346; 3,073,585; and 3,536,314 as well as in Characteristics of Ring Springs by Tyler G. Hicks, American Machinist, 1928, pages 192–195 and Mechanical Springs, First Edition, Arthur M. Wahl, Penton Publishing Co., 1944, pages 348–358.

It is an object of this invention to provide a shock sub which incorporates a ring spring assembly and a technique for using the same.

A further object of this invention is to provide a ring spring shock sub which provides an unusually low spring rate and an unusually high deflection.

Other objects and a fuller understanding of the invention may be had by reference to the following description taken in conjunction with the accompanying drawings and claims.

IN THE DRAWINGS

FIG. 1 is a sectional view through the earth illustrating the drilling of a hole therein by a drill string incorporating a shock sub of this invention;

FIGS. 2A and 2B are partial longitudinal vertical cross-sectional views of the shock sub of this invention;

Figure 3:
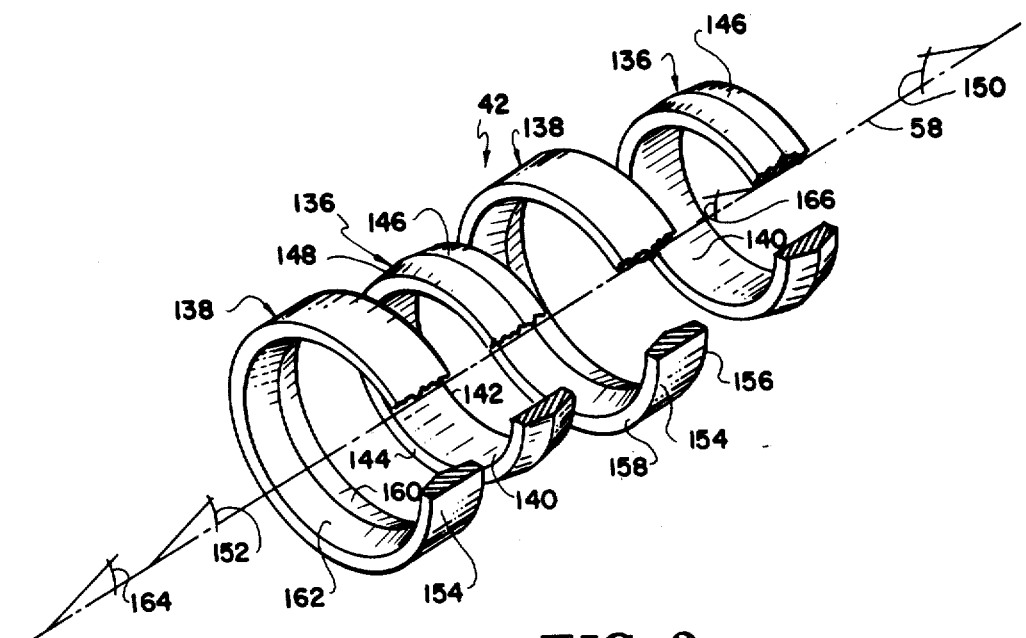
FIG. 3 is an exploded broken isometric view of the ring springs incorporated in the shock sub of FIGS. 2A and 2B.

Referring to FIG. 1, there is illustrated a hole 10 being drilled in the earth through a string 12 of surface pipe placed therein and bonded to the earth by a cement sheath 14. The hole 10 is being drilled with a bit 16 connected by a drill string 18 suspended from a travelling block 20 by a conventional hook up 22 including a kelly 24. The travelling block 20 is suspended from a suitable crown block (not shown) provided by a suitable drilling rig (not shown). Drilling fluid is pumped through a mud line 26 into the drill string 18, exits through nozzles (not shown) in the bit 16 and then circulates upwardly through the annulus between the hole 10 and the drill string 18 to remove cuttings, cool and lubricate the bit 16, and control formation pressures as is customary in the art.

The drill string 18 comprises a shock sub 28 of this invention, a multiplicity of drill collars 30 and a string of drill pipe 32 illustrated as including a number of pipe joints having externally upset box and pin connections which are universally screw thread connections. The function of the drill string 18 is to conduct drilling fluid to the bit 16, to transmit torque to the bit 16, to stabilize the direction of drilling, to provide means for removing the bit 16 from the hole 10, and to apply weight to the bit 16. More specifically, the general function of the drill pipe 32 is to provide a mechanical and hydraulic connection to the drill collars 30. The drill collars 30 provide a mechanical and hydraulic connection between the drill pipe 32 and the bit 16 but also act to apply weight to the bit 16 and to stabilize the direction of drilling. The drill collars 30 are typically massive pipe joints providing a substantial amount of weight immediately above the bit 16 and are as inflexible as practicalities allow.

One of the early lessons in drilling with rotary drill pipe was that the bulk of the drill string 18 must be kept in tension with only the lower part of the drill collars allowed to be in compression in order to drill a relatively straight hole. Thus, the so-called neutral point 34 divides the drill string 18 into a relatively short lower section which is in compression and a relatively long upper section which is in tension. Accordingly, if it is desired to maintain 50,000 pounds of weight on the bit 16, it would not be unusual for the total weight of the drill collars 30 to be in excess of 100,000 pounds in order to compensate for the buoyancy of the drill collars 30 in the drilling fluid, to accommodate the reaction force of mud passing through the bit nozzles, and to maintain the neutral point 34 far below the top of the drill collars 30.

As pointed out previously and as discussed in great detail in the articles in the Journal of Engineering for Industry and in the AIME Transactions cited above, the drill string 18 is subjected to substantial axial oscillations during drilling. The data indicates that the provision of shock subs can substantially decrease the maximum amplitude of the oscillations, particularly at relatively high rotary speeds. In addition, the date indicates that a shock sub having a spring rate of 500,000 pounds per foot of deflection (41,668 pounds/inch of deflection) is as effective at low rotary speeds as a shock sub having a spring rate of 1,000,000 pounds per foot of deflection (83,333 pounds/inch of deflection) and is considerably more effective at higher rotary speeds. Because high rotary speeds are particularly desirable to achieve high penetration rates when drilling relatively hard formations, it is believed that shock subs having even lower spring rates would be more desirable at high rotary speeds. Although the present suppliers of shock subs have obviously taken substantially different views of the importance of low spring rates, Johnston-Schlumberger is quite proud of the spring rate of 35,000 pounds per inch of deflection in its helical spring type shock sub. It is accordingly apparent that low spring rate shock subs are deemed to be highly desirable by some segments of the industry.

Referring to FIGS. 2A and 2B, there is illustrated the shock sub 28 of this invention. Broadly, the shock sub 28 comprises a barrel 36, a mandrel 38 telescopingly received in the barrel 36, means 40 for transmitting torque between the barrel 36 and mandrel 38, a spring assembly 42 for damping relative movement between the barrel 36 and mandrel 38, and means 44 for equalizing the fluid pressure around the spring assembly 42 with that inside the mandrel 38.

The barrel 36 may be of any suitable construction and is illustrated as comprising a plurality of connected threaded components including an upper body or washpipe 46 having a female threaded connection 48 for attachment in the drill string 18, a central passage including a relatively small initial section 50 and an enlarged lower section 52. The lower end of the upper body 46 terminates in a threaded end 54. For purposes more fully apparent hereinafter, the upper body 46 also includes one or more threaded openings 56 transverse to the tool axis 58 which is closed by a threaded sealing plug 60.

The next section of the barrel 36 is a spline body 62 having an upper end 64 providing male threads engaged with the threaded end 54 of the upper body 46. The spline body 62 provides a central passage 66 sized to closely receive the mandrel 38 and provides a plurality of circumferentially spaced longitudinally or helically extending splines 68 extending interiorly of the passage 66. The spline body 62 terminates in a lower end 70 having male threads thereon.

The next section of the barrel 36 is a middle body 72 having an upper threaded end 74 engaged with the threads of the lower end 70 of the spline body 62. The middle body 72 provides a central passage 76 of substantially greater diameter than the passage 66 and one or more transversely extending passages 78 having a threaded sealing plug 80 therein. The body 72 terminates in a lower threaded end 82.

The barrel 36 terminates in a packing nut 84 having an upper threaded end 86 engaged with the threads of the middle body 72. The packing nut 84 provides an internal passage 88 sized to closely receive the mandrel 38 and is intermediate in diameter to the passages 66, 76. The lower terminal end of the packing nut 84 provides a plurality of recesses each of which receives an annular packing member 90. A surface 92 perpendicular to the tool axis 58 constitutes the end of the packing nut 84.

The mandrel 38 includes an enlarged lower end 94 having a female threaded connection 96 in the end thereof for attachment to the drill string 18. Because the shock sub 28 has female connections at its opposite ends, it can be connected between the bit 16 and lowermost drill collar 30 without requiring the use of an adapter sub. The lower end 94 terminates in a shoulder 98 facing the barrel 36 which is perpendicular to the tool axis 58. It will be seen that the maximum travel between the barrel 36 and mandrel 38, in a collapsing or telescoping direction, is dictated by the spacing between the surface 92 and the shoulder 98.

The mandrel 38 also includes a mandrel body section 100 integral with the enlarged end 94 and includes a cylindrical external surface 102. One or more grooves 104 are cut in the surface 102 adjacent the packing nut 84 which receive a wear ring 106. The wear rings 106 are typically made of an organic polymeric material which is subject to being transferred to an adjacent metal surface by friction contact and which exhibits a low coefficient of friction. One exemplary material for the wear rings 106 is tetrafluoroethylene. During relative movement of the mandrel 38 and barrel 36, the material of the wear rings 106 is distributed onto the surface of the passage 88 and thereby acts to minimize or prevent scuffing of the surface 102 and the passage 88.

The body section 100 joins another mandrel body section 108 of reduced diameter having an external surface 110. The diameter of the cylindrical surface 110 is only slightly less than the diameter of the passage 66 of the spline body 72. It will be seen that there is provided an annular chamber between the internal passage 76 of the middle body 72 and the surface 110. Adjacent a shoulder 112, the mandrel body section 108 provides an exteriorly threaded section 114 which receives a mandrel nut 116 having female threads 118 engaging the threaded section 114. A set screw 120 extends through the mandrel nut 116 and acts to secure it in position.

The external surface 110 of the body section 108 provides, adjacent the spline body 62, a plurality of grooves 122 which are preferably longitudinally extending but which may be of helical shape, receiving the splines 68 of the spline body 62. It will be evident that the splines 68 and grooves 122 cooperate to provide the torque transmitting means 40 so that rotation of the barrel 36 results in rotation of the mandrel 38.

The upper extremity of the mandrel body section 108 includes a threaded end 124 receiving an internally threaded end 126 of a washpipe 128 comprising part of the mandrel 38. The lower end of washpipe 128 includes a surface 130 perpendicular to the tool axis 58 and cooperates with a facing perpendicular surface 132 provided by the spline body 62 to limit expanding or untelescoping movement of the barrel 36 and mandrel 38.

A central passage 134 extends through the mandrel 38 from the top of the washpipe 128 through the threaded connecton 96 and allows the delivery of drilling fluid from the passage sections 50, 52 through the end of the shock sub 28. As suggested previously, the passage 134 should be no smaller than about 1½" in diameter to allow the passage of drilling fluid without undue pressure loss and to allow a fishing spear to enter the washpipe 128 in the event the mandrel 38 becomes lost in the hole 10.

Referring to FIGS. 2B and 3, the spring assembly 42 includes a plurality of inner annular ring springs 136 and a plurality of outer annular ring springs 138. The ring springs 136, 138 are alternately stacked in the chamber provided between the barrel 36 and the mandrel 38. As will be seen, telescoping or collapsing movement of the barrel 36 and mandrel 38 causes each of the springs 136, 138 to be stressed substantially only in a plane perpendicular to the tool axis 58. When stressed, the inner ring springs 136 are placed in compression while the outer ring springs 138 are placed in tension.

All of the inner ring springs 136 are desirably identical. Although the cross-sectional shape of the rings springs 136 may vary substantially as pointed out in the publications and patents relative to ring springs cited previously, in order to maximize the cross-sectional area of the inner ring springs 136 while maximizing the allowable external diameter of the body section 108, the inner ring springs 136 preferably comprise a radially inner cylindrical surface 140. The inner diameter of the surface 140, in either the unstressed or fully stressed condition of the ring springs 136, is larger than the diameter of the cylindrical surface 110. As will be more fully pointed out hereinafter, the maximum stress applied to the ring spring assembly 42 and consequently the maximum stress applied to each of the springs 136 is controlled by the amount of collapsing movement allowed by the spacing between the surfaces 92, 98.

The inner ring springs 136 also include upper and lower surfaces 142, 144 which are generally transverse to the tool axis 58 and which are preferably perpendicular thereto. The radially outer surface of the inner springs 136 includes a pair of surfaces 146, 148 which are frustoconical in configuration and which include a common maximum diameter. The surfaces 146, 148 define oppositely facing acute angles 150, 152 respectively with the tool axis 58. As will be more fully apparent hereinafter, it is preferred that the angles 150, 152 be substantially identical.

The outer ring springs 138 are also desirably identical. Although the outer ring springs 138 may also be of any suitable shape, in order to maximize the cross-sectional area in a plane including the tool axis 58, the ring springs 138 include a radially outer cylindrical surface 154. The diameter of the radially outer surface is less, in either the unstressed or fully stressed condition of the spring assembly 42, than the diameter of the passage 76 provided by the middle body 72.

The outer ring springs 138 include upper and lower surfaces 156, 158 which are transverse to the tool axis 58 and which are preferably perpendicular thereto. The radially inner surface of the outer ring springs 138 include a pair of surfaces 160, 162 which are frustoconical in configuration and which include a common minimum diameter. The surfaces 160, 162 define oppositely facing acute angles 164, 166 respectively with the tool axis 58.

If the angles 150, 152, 164, 166 are substantially identical, this will allow all of the inner ring springs 136 to be identical and all of the outer ring springs 138 to be identical. This is, of course, highly desirable when it is necessary to replace any of the springs 136, 138. In addition, this provides considerable simplicity in design and manufacture of the shock sub 28.

The design selection of the quantity for the angles 150, 152, 164, 166 is of substantial importance as is the cross-sectional area of the inner and outer ring springs 136, 138. The stress induced in the springs may be calculated from the equation $$S = (\text{Load}) \tan \alpha / \pi A K \qquad (2)$$

where S is the maximum stress in each spring, A is the cross-sectional area of each individual spring, $\alpha$ is the angle 150, 152, 164, 166 and K is a constant of the system and is a function of $\alpha$. Thus, in order to provide for the maximum load induced in each spring, the cross-sectional area A should be maximized. In addition, the cross-sectional areas of the springs 137, 138 are desirably identical. The value of K may be obtained from the equation provided in the publication of Wahl cited previously. The maximum value for the angles 150, 152, 164, 166 can be obtained from equation (2) because the maximum value of S is a function of the material of the springs 136, 138 and the load value is dictated by the desired capacity of the shock sub 28. It may be, however, that one may wish to select a smaller value for $\alpha$ because the spring rate of each individual spring will generally decrease as the value of $\alpha$ decreases. In general, the value of $\alpha$ in shock subs of this invention will lie in the range of 5°–20° and a preferred range is on the order of 11°–15°.

One of the oddities of ring spring assemblies lies in the relationship between the number of springs and the spring rate of the assembly. Because the weight applied by the drill collars 30 to the barrel 36 is transmitted through each of the ring springs 136, 138, it will be seen that each spring is subjected to the entire applied load. Accordingly, $$SR_a = (\text{Load}/(D_s)(n)) \qquad (3)$$

where $SR_a$ is the spring rate of the assembly, $D_s$ is the deflection of each individual spring and n is the total number of springs. Because the design load remains the same, the deflection of each spring in an axial direction will remain the same, independently of the number of springs employed, because the amount of each deflection of each spring is directly related to the applied load. Thus, the spring rate of the assembly 42 may be modified merely by changing the number of springs in the assembly 42. This has two significant aspects. First, in the design of this shock sub the desired spring rate can be achieved merely by selecting the number of springs. Second, the spring rate of an existing shock sub can be increased by replacing some of the springs with a spacer or can be decreased by removing a spacer from the spring chamber and replacing it with operative springs.

Referring to FIG. 2A, the pressure equalizing means 44 includes a floater 168 of annular construction having an internal diameter sized to slide closely on the external surface of the washpipe 128 and an external diameter sized to slide closely on the wall of the passage section 52. The floater 168 is preferably made of organic polymeric material, such as Ryton, and provides one or more interior annular grooves receiving a packing member 170 and one or more external annular grooves receiving a packing member 172. A floater stop 174 provides one limit of sliding movement of the floater 168 and a shoulder 176 on the washpipe 128 provides another limit of travel.

The function of the floater 168 is to equalize the pressure in the spring chamber with the pressure inside the shock sub 28. This is accomplished because the floater 168 moves downwardly upon increase in hydrostatic pressure inside the mandrel to increase the pressure in the spring chamber or moves upwardly when the hydrostatic pressure inside the mandrel declines. This has two effects. First, the pressure differentials sensed by the seals 170, 172 and the packing members 90 will be substantially reduced. Second, there would be a tendency for the mandrel 38 and barrel 36 to lock up hydraulically because the spring chamber is filled with a lubricant and because the spring chamber is variable in size depending on the relative position of the barrel 36 and mandrel 38. It will be seen that the floater 168 resolves these difficulties in a simple and expeditious manner.

In order to fill the spring chamber with a lubricant, one of the sealing plugs 60, 80 may be removed and a liquid lubricant poured therethrough. In order to prevent the accumulation of air in the lubricant filled annulus between the mandrel 38 and barrel 36, both sealing plugs 60, 80 may be removed, lubricant pumped into the lower of the openings 56, 78 while allowing air to discharge from the other opening and periodically tilting the sub 28.

One of the features of the shock sub 28 that is not immediately apparent is that the maximum deflection allowed by the spring between the shoulders 92, 98 is selected to be related to the maximum permissible deflection of the spring assembly 42 which is related to the maximum permissible deflection of each of the ring springs 136, 138. The maximum permissible deflection of each spring 136, 138 may be calculated from the teachings of Hicks and Wahl, supra, and is a function of the elastic limit of the material selected. The maximum deflection of the spring assembly 42 is, of course, the maximum deflection of each spring multiplied by the number of springs. This distance is then selected from the spacing between the shoulders 92, 98. Thus, the spacing between the shoulders 92, 98 is selected so that the mandrel 38 and barrel 36 bottom out before the elastic limit of the springs is reached.

When the shock sub 28 is utilized in the drill string 18, the bit 16 is desirably threaded into the screw connection 96 of the mandrel 38 and the lowermost drill collar 30 is threaded into the screw connection 48 of the barrel 36. When drilling mud, for example, is pumped down the drill string 18, there is created a pump open force F acting on the mandrel 38 which tends to untelescope the mandrel 38 and barrel 36. The amount of the pump open force F is readily calculated by multiplying the unbalanced areas of the mandrel 38 by the pressure acting thereon. Another force acting on the shock sub 28 during drilling is a reaction force $F_r$, usually called bit thrust, caused by passage of the drilling fluid through the nozzles of the bit 16. In order to stress the spring assembly 42, the weight applied by the drill collars 30 must exceed the pump open force F less the bit thrust $F_r$. Normally, the pump open force F is greater than the bit thrust $F_r$. Thus, the spring assembly 42 would not be stressed, in the absence of special provisions, until a significant amount of weight is placed on the barrel 36. The difference between the pump open force F and the bit thrust $F_r$ can be considered to be a base line or threshold in the sense that the weight of the drill collars equal to this value must be applied to the shock sub 28 before the damping characteristics of the spring assembly 42 are brought into play. Rather than assembling the shock sub 28 with the springs 136, 138 unstressed, it is desirable to preload the spring assembly 42 in order to prevent the springs from becoming skewed relative to the axis 58. A preload in the order of about 10% of the design deflection has proved suitable.

As sufficient weight is applied to the barrel 36, the ring springs 136, 138 are stressed to transmit the applied load to the mandrel 38 and consequently to the bit 16. As the bit 16 is rotated on the bottom of the hole 10, the oscillations induced in the mandrel 38 are damped during transmission through the spring assembly 42 to the barrel 36.

A shock sub in accordance with the principles of this invention has been constructed to accommodate a nominal load of 50,000 pounds and has a maximum deflection of 4⅛". The spring assembly 42 comprises twenty inner ring springs 136 and twenty outer ring springs 138. The unstressed height of the spring assembly 42 is about twenty five inches. The tool is 6⅞" in outer diameter and provides an internal passage 134 of 1¾" in diameter. The sub is about eight feet long.

One of the advantageous features of the shock sub 28 is its short length. It will be apparent that the stability of the lower end of the drill string 18 is promoted by a short shock sub. Thus, the shock subs of this invention are characterized by a relatively short length, usually under ten feet long and preferably about eight feet long.

Referring to FIG. 2B, another feature of the invention is illustrated. In normal operation of the device, with a substantial load imparted to the barrel 28, the spring assembly 42 is loaded prior to the commencement of drilling operation. The adjacent ring springs 136, 138 provide a metal-to-metal seal therebetween. Accordingly, lubricant below the floater 168 has ready access to the inner annular portion of the spring chamber defined between the exterior mandrel surface 110 and the mating conical surfaces of the springs 136, 138. It appears, however, that lubricant in an outer annular portion of the spring chamber, i.e. defined by the inner surface of the middle body 72 and the mating surfaces of the ring springs 136, 138, is trapped and is not subject to the equalizing effects of the floater 168. Accordingly, one or more passages or grooves 178 are provided in the lower portion of the end 70 of the spline body 62 to provide communication between the outer portion of the spring chamber and the inner portion thereof. It will be evident that similar passages may be provided in the springs 136, 138 or in the mandrel nut 116.

One lesson learned from this experience is that the ring springs 136, 138 remain in contact throughout the range of telescoping movement of the mandrel 38 and barrel 36. This is not, of course, surprising since the spring assembly 42 is substantially loaded during use and the springs 136, 138 are well machined and inadvertently provide a metal-to-metal seal.

In operation, the shock sub 28 is run in the drill string 18 at a location quite close to the bit 16 and substantially below the neutral point 34 in order to prevent oscillations of the bit 16 from inducing vibrations in the drill collars 30 which tend to become harmonic in nature and of considerable magnitude.

When drilling and assuming that the bit 16 tends to rise off of the rock face being drilled, as when a tooth on the cone does not embed in the rock being drilled or for whatever other reason, the mandrel 38 tends to rise relative to the barrel 36 thereby expanding the springs 136, 138 an additional increment over and above the expansion caused by loading of the spring assembly 42 by the drill collars 30. This stressing of the spring assembly 42 and the consequent frictional loss between the springs 136, 138 retards upward movement of the mandrel 38 and tends to damp the resultant jar imparted to the drill string 18 above the shock sub 28. When the bit 16 tends to move rapidly downwardly during drilling, as when a tooth suddenly embeds in the rock face being drilled or for whatever other reason, the mandrel 38 tends to move dowwardly relative to the barrel 36 thereby decreasing the stress in the spring assembly 42. Because the springs 136, 138 are decreasing in stress, they tend to move the mandrel 38 downwardly more rapidly than the fall of the barrel 36.

It will accordingly be seen that the shock sub 28 acts to reduce vibrations of the drill collars 30 by retarding upward movement of the barrel 36 when the mandrel 38 moves relatively upward and by accelerating downward movement of the mandrel 38 when it is undergoing downward movement. Both of these techniques tend to minimize oscillation build up in the drill string 18.

It is also known in the art that torsional oscillations in a drill string are induced during drilling. The device of this invention also acts to retard torsional oscillations in the following fashion. Assuming for purposes of illustration that there is an exaggerated amount of play in the splines 68, any tendency of the bit 16 to slow its rotational motion causes a minor but perceptible tendency of the springs 136, 138 to rotate relative to one another. Because the springs 136, 138 are under considerable load, the tendency of the mandrel 38 to rotate relative to the barrel 36 is retarded because of frictional losses occurring between the springs 136, 138.

Although this invention has been described in conjunction with a conventional rotary drilling technique in which the drill string 18 is rotated at the surface, shock subs in general and the shock sub of this invention in particular are quite desirable for use with down hole powered drills in which the bit is turned by a motor suspended in the hole by a drill string which is not normally rotated at the surface. Typical down hole motors of this type are the turbine variety and the drill is known as a turbodrill. In order to insulate the turbodrill from the oscillations induced in the bit, the shock sub 28 is located below the motor in the drill string.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed.

I claim:

1. A shock sub for connection in a drill string, comprising
   a barrel having means at one end for connection to the drill string;
   a mandrel mounted in the barrel for telescoping movement along a longitudinal axis, having means at one end for connection to the drill string and defining, with the barrel, a vertically extending annular spring receiving chamber;
   means for transmitting torque between the barrel and mandrel;
   a ring spring assembly in the chamber for damping relative movement of the mandrel and barrel, the assembly comprising
   a multiplicity of inner and outer annular ring springs residing in planes transverse to the axis,
   the inner ring springs comprising radially outer surfaces inclined to the axis,
   the outer ring springs comprising radially inner surfaces inclined to the axis and engaging the radially outer surfaces of the inner ring springs for providing a metal-to-metal seal dividing the ring receiving chamber into radially inner and radially outer chamber segments;
   the assembly exhibiting a substantially constant spring rate of less than 25,000 pounds per inch of deflection and a load capacity of between 10,000–125,000 pounds;
   means carried by the mandrel and barrel for expanding the outer ring springs and compressing the inner ring springs upon collapsing movement of the mandrel and barrel;
   a lubricant in the chamber; and
   means providing communication between the radially inner and radially outer chamber segments.

2. The shock sub of claim 1 wherein the barrel and mandrel provide a fluid passage extending along the longitudinal axis and provide an annular passage communicating with the spring receiving chamber and further comprising an annular piston in the annular passage for equalizing pressure between the spring receiving chamber and the longitudinal fluid passage.

3. A method of drilling a hole in the earth using a drill string comprising a bit, a shock sub, a plurality of drill collars and a string of drill pipe, the shock sub including a barrel; a mandrel mounted in the barrel for telescoping movement along a longitudinal axis; a ring spring assembly for damping relative movement of the mandrel and barrel, the assembly comprising a multiplicity of inner and outer annular ring springs residing in planes transverse to the axis, the inner ring springs comprising radially outer surfaces inclined to the axis, the outer ring springs comprising radially inner surfaces inclined to the axis and engaging the radially outer surfaces of the inner ring springs, the assembly exhibiting a spring rate of less than 25,000 pounds per inch of deflection and a load capacity of between 10,000–125,000 pounds; and means carried by the mandrel and barrel for expanding the outer ring springs and compressing the inner ring springs upon collapsing movement of the mandrel and barrel, the method comprising
   applying a load to the bit in the range of 10,000–125,000 pounds;
   maintaining the neutral point of the drill string substantially above the shock sub;
   rotating the bit;
   causing the mandrel and barrel to telescope relative to one another in both inward and outward telescoping directions during load application and bit rotation;
   damping oscillations induced in the drill string in both the inward and outward telescoping directions by changing the stresses induced in the ring spring assembly; and
   maintaining the inclined surfaces of the inner and outer ring springs continually in engagement with each other.

4. The method of claim 3 wherein the damping step comprises alternately stressing and relaxing the inner and outer ring springs in a plurality of generally parallel planes transverse to the axis.

* * * * *